July 8, 1952  G. B. MANNING  2,602,349
METER RESET LOCKING AND SEALING MEANS
Filed June 23, 1951
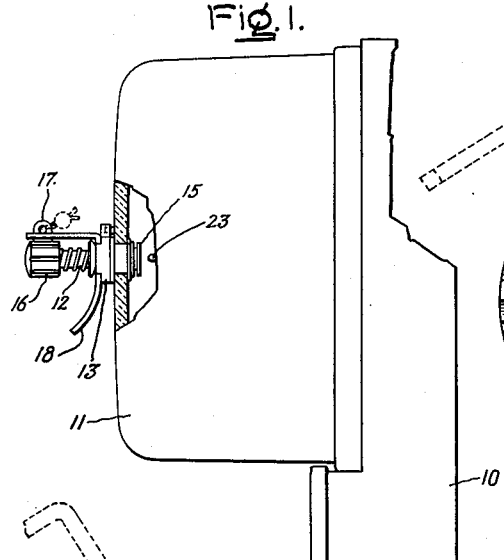
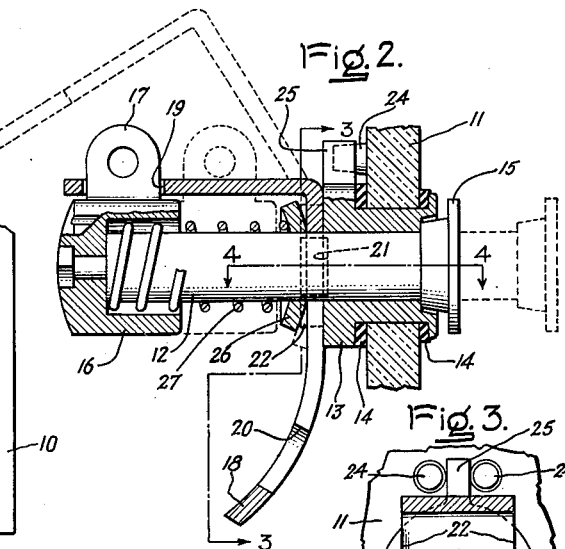
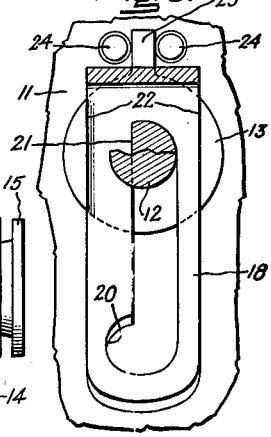
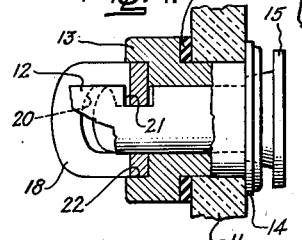
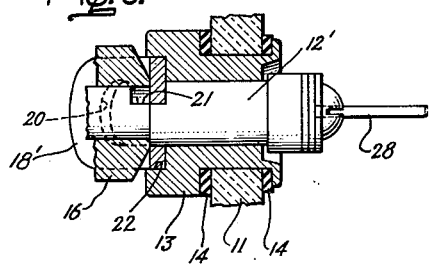
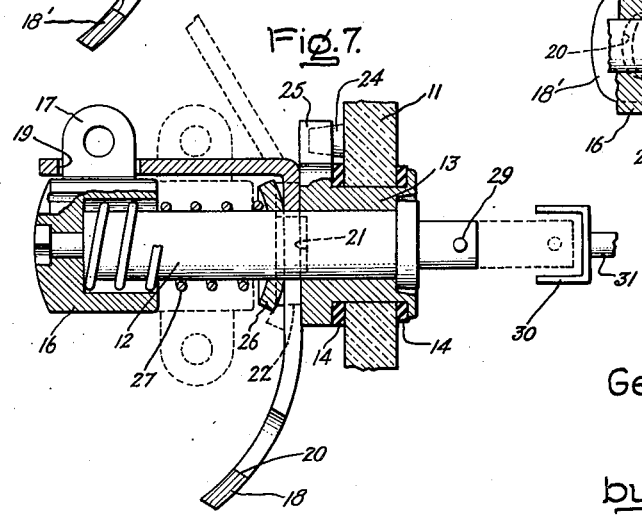
Inventor:
George B. Manning,
by Russell A. Warner
His Attorney.

Patented July 8, 1952

2,602,349

UNITED STATES PATENT OFFICE 2,602,349

METER RESET LOCKING AND SEALING MEANS

George B. Manning, Schenectady, N. Y., assignor to General Electric Company, a corporation of New York Application June 23, 1951, Serial No. 233,227

4 Claims. (Cl. 74—503)

My invention relates to resetting means for demand meters and the like, which resetting means extends through a wall of the meter casing and permits of the setting or resetting of some meter part only by some authorized person and without opening the meter casing. It is the object of my invention to provide foolproof means which is readily adapted for several different kinds of setting and resetting operations, and which may be securely sealed or locked, or both, in nonoperative position when not being used.

The features of my invention which are believed to be novel and patentable will be pointed out in the claims appended hereto. For a better understanding of my invention reference is made in the following description to the accompanying drawing in which Fig. 1 shows a partial side view of a meter casing with a portion of the cover part broken away to indicate how my reset device is mounted through the front wall of the meter cover. Fig. 2 is a more detail sectional side view of the meter reset device of Fig. 1. Fig. 3 is a partial view taken on line 3—3 of Fig. 2 to show the shape of opening in the angular locking strap and of the push rod on which the strap slides, the strap being shown in locking or sealing position. Fig. 4 is a partial sectional view taken on line 4—4 of Fig. 2 to illustrate how the push rod is locked in nonrotational relation with respect to the bushing. The parts of the device shown in Figs. 1 to 4 are dimensioned and adapted to perform a resetting operation by pushing in the rod which extends through the meter cover. Fig. 5 illustrates a partially sectioned side view of a form of the invention which is adapted to perform a resetting operation by rotation of the rod which extends through the meter cover. Fig. 6 is a section taken on line 6—6 of Fig. 5 to illustrate locking details. Fig. 7 shows a reset device essentially similar to that of Fig. 2 but having a meter engaging rod adapted to be pushed inwardly and then turned to perform a resetting operation.

Referring now to Fig. 1, 10 may represent a casing for a watthour hour meter having maximum demand measuring and accumulative register attachments, and 11 the cover, usually of glass, of such meter. A meter of the type here contemplated is shown in United States Patent No. 2,006,321 of June 25, 1935, Stark et al., assigned to the same assignee as the present invention, and from which it will be noted (Fig. 1 of such patent) that a resetting operation is performed by momentarily pushing in on a shaft 23 by a push rod 24 extending through the meter cover. In Fig. 1 of applicant's drawing the part 23 may represent the corresponding shaft of such patent. The resetting push rod of my invention which extends through the glass cover is designated by reference character 12 and is intended, when momentarily pushed in as represented by dotted lines in Fig. 2, to set in motion the resetting operation analogous to that described in the above-mentioned patent.

The circular push rod 12 has a sliding and rotational fit through a bushing 13 which extends through and closely fits an opening in the front wall 11 of the meter. The bushing is provided with inner and outer collars, the inner one of which may be formed by spinning or otherwise upsetting the metal of which the bushing is formed after the bushing is inserted in the opening provided therefor in the glass cover. Gaskets 14 are preferably provided between the bushing collars and the glass cover to provide a dust-and moisture-tight closure about the bushing. It will be understood that when not in use the push rod 12 is out or to the left as shown in full lines in Fig. 2, and that when in such position it is required that it be securely locked and sealed in such position to prevent tampering or use by other than the person who is authorized to reset the meter.

The inner end of rod 12 is enlarged at 15 to limit its outward travel, and the outer end has an enlarged button or head 16 thereon which limits inward travel of the push rod and is provided with a radially extending tab 17 which serves as a sealing staple for securing and sealing a locking bar 18. The locking bar has a right angle bend therein which divides the bar in an upper hasp part which is horizontal, and a lower locking part which extends downward and preferably curved towards the front at its lower end when the bar is in the locking position as shown in full lines in Fig. 2. The front end of the upper horizontal part of this locking bar has a slit 19 therein and forms a hasp adapted to fit over the tab or staple 17, and to be sealed in place by a seal wire passed through an opening in the tab 17 as represented in Fig. 1. The lower portion of the locking bar has an elongated slot opening therein through which the rod 12 passes. This slot in the locking bar is of uniform width except at the lower end which has an offset enlargement 20 slightly larger than the full diameter of rod 12.

The push rod 12 has a transverse slot 21 cut in one side thereof wide enough to accommodate the thickness of the locking bar and at a point in approximate alignment with the front of bushing 13 when the push rod is out, and of a depth of approximately one-third the diameter of such push rod such that the remaining thickness of the push rod at such slot corresponds approximately to the width of the narrow portion of the slot provided in the locking bar 18. Hence, the narrow slot portion of such locking bar 18 may straddle push rod 12 only at the slot 21 therein, as best shown in Fig. 3. The front end surface of bushing 13 has a vertical transverse central slot 22 machined therein of a width and depth corresponding to the width and thickness of the locking bar 18. Such bushing slot 22 is in alignment with the slot 21 in push rod 12 when the latter is in the out position as shown in Fig. 2. In the locked condition, the narrow slot portion of the locking bar 18 straddles push rod 12 when the push rod is out, and the slot 21 in such push rod is vertical and the locking bar is vertically aligned with and is contained in the bushing slot 22, as represented in Figs. 2, 3, and 4. The bushing 13 is fastened through the wall of the glass cover with its front slot 22 vertical, and is prevented from being turned from this position as, for example, by a pair of forward projections 24 molded in the glass of the cover 11 adjacent the bushing and between which a radial projection 25 of the bushing fits so that the bushing is locked from turning when secured in place.

It will now be evident that with the parts positioned as indicated in full lines in Figs. 2, 3, and 4, the push rod 12 is locked in its outer position by the locking bar 18 and cannot be pushed inwardly. Also, neither the push rod 12 nor the locking bar 18 may be turned either singly or together. To release the push rod, the locking bar is raised until the enlarged part 20 of the slot in such locking bar is in alignment with the push rod. Such opening 20 is slightly larger than the unslotted diameter of the push rod and when the locking bar is thus raised to a position indicated by dotted lines in Fig. 2, the push rod may be pushed to the rear or right in Fig. 2 as represented by dotted lines, thus to perform some operation like resetting a meter, a relay or the like without opening the casing. Likewise, the push rod may also be turned as a shaft, if so desired.

Preferably, a washer 26 and a compression spring 27 are provided on the push rod between the locking bar 18 and head 16 to assure a quick and positive return of the push rod to its outer position after the push rod has been pushed in and then released. To prevent raising of the locking bar and unlocking the push rod by unauthorized persons, it will be evident that when the parts are in the full line positions of Figs. 2, 3, and 4, the locking bar may be sealed in locking position by passing a sealing wire through the opening provided therefor in the projection 17 of head 16 and sealing as represented in Fig. 1. Also, a padlock may be used with its hasp inserted through the enlarged lower end opening 20 of the locking bar and locked. This will prevent the locking bar from being raised to unlocking position. To make it easier to use a padlock in this fashion, the lower end of the locking bar is preferably bent forward slightly away from the glass cover to allow ample room for the padlock. The bend is made sufficiently gradual as not to interfer with raising the bar to unlocking position and aligning opening 20 with the push rod 12. A seal wire may also be used in the opening 20 since such wire would need to be severed to raise the locking bar all the way up to unlocking position. The head or cap 16 should be riveted, welded, or otherwise secured on the push rod in a way to discourage tampering, although it could not be removed if loosened without also lifting the locking bar from over projection 17. It will be noted that there are no parts that can or need to be removed except a seal or padlock in performing a resetting operation. Hence, a resetting operation may be performed quickly and the possible loss of removable parts is avoided.

In some meters such, for example, as the meter described in United States Patent No. 2,247,108, June 24, 1941, Witherow, assigned to the same assignee as the present invention, the resetting operation is performed by merely rotating a shaft such as the shaft 21, Fig. 1, of such patent. For such purposes it often is unnecessary to provide for endwise movement of the part designed as a push rod 12 in Fig. 2, and it may be shortened accordingly as represented at 12' in Figs. 5 and 6. Likewise, the upper horizontal portion of the locking bar designated 18' in Fig. 5 may be shortened to correspond. The inner end of shaft 12' is provided with the proper tool such as the crank arm 28 to engage with the meter part such as a pivoted pointer or arm 29 to accomplish the desired setting operation when the shaft 12' is turned. The washer 26 and spring 27 of Fig. 2 are not needed in Fig. 5 and are omitted.

Except as noted, the device of Figs. 5 and 6 is essentially like that of Fig. 2. The locking bar 18' of Figs. 5 and 6 when in locked position as shown in full lines prevents rotation of shaft 12' and although not required here, the locking bar would also prevent any appreciable endwise movement of shaft 12' as in Fig. 2. In practice the shaft 12' is unlocked by unsealing or unlocking the locking bar 18' and raising the same to dotted line position where the enlarged lower end opening 20 aligns with the unslotted cross-sectional contour of shaft 12', which permits the latter to be turned. Dotted lines in Fig. 5 indicate the positions of head 16 and crank arm 28 when the shaft 12' has been turned 180 degrees from the position shown in full lines. After a resetting operation the head 16' is brought back to the angular position where the staple 17 is uppermost, and the locking bar is dropped back to the lowered position shown in full lines in Fig. 5, and the device sealed or locked.

The device of Fig. 7 is like that of Fig. 2 with the possible exception the nature of the tool 29 on the inner end of the push rod shaft 12, and in fact, the device of Fig. 7 could be used exactly as explained for the device of Fig. 2. The tool end 29 of the push rod shaft as shown in Fig. 7 is arranged to transmit rotational torque after being pushed in where the transverse pin shown at 29 can engage in driving relation with the limbs of a forked part 30 on the end of meter shaft 31 when the shaft 12 is turned. Such a resetting arrangement will be useful where the shaft 31 is to be turned in response to some meter operation between resetting periods with the assurance that there will be no interference from the resetting device, but where the shaft 31 is to be turned for resetting purposes also. The dotted line positions of parts indicated in Fig. 7 indicate that the locking bar 18 has been moved to unlocking position, that the shaft 12 was pushed in, and then turned 180 degrees.

Modifications of this invention will occur to those skilled in the art and it is desired to be understood, therefor, that this invention is not to be limited to the particular embodiment disclosed, but that the appended claims are meant to cover all the modifications which are within the spirit and scope of this invention.

What I claim as new and desire to secure by Letters Patent of the United States is:

1. A reset device for transmitting motion through a casing wall comprising in combination with a wall having an opening therethrough, a bushing extending through said opening in fixed relation to said wall, a circular rod extending through said bushing, enlargements on the opposite ends of said rod preventing removal of the rod from said bushing, a radially extending staple at the outer end of such rod, a locking bar having a hasp portion adapted to fit over said staple and to be sealed thereon by a sealing wire and a locking portion having an elongated slot therein through which said rod passes, such slot being enlarged at one end to the full diameter of said rod and being of a uniform lesser width than the diameter of said rod over its remaining length, said rod having a transverse slot cut in one side thereof to reduce the remaining thickness of the rod at this point so as to pass through the lesser width portion of the locking bar slot and prevent any appreciable relative rotation or axial movement between said locking bar and rod, said locking bar being movable between a locking position where its hasp engages said staple and the narrow slot portion thereof embraces the slotted section of said rod and an unlocked position where its hasp portion is removed from said staple and the enlarged end of its slot embraces said rod, said bushing having a transverse slot in its outer end receiving said locking bar when in its locked position and preventing rotation of the locking bar relative to said bushing.

2. A reset device for meters and the like of the type adapted to transmit motion from the exterior to the interior of a casing comprising in combination with a casing wall having an opening therethrough, a bushing extending through said wall opening and immovably secured to said wall, a circular rod extending through said bushing with a sliding and rotational fit, said rod having end enlargements to prevent its being removed from said bushing, a radially extending sealing staple at the outer end of said rod, a locking bar having a hasp portion and a locking portion bent at right angles to each other, the locking portion having an elongated slot therein, the slotted portion straddling said rod between the outer end of the bushing and the staple and with the hasp portion of the locking bar extending towards the staple, the outer end portion of the slot in the locking bar being large enough to pass the rod freely therethrough and the remaining portion of such slot having a width less than the diameter of said rod, said rod being slotted transversely at the point where it passes through the locking bar so as to pass through the narrow slot portion of the locking bar and under which condition the locking bar prevents any appreciable axial and rotational movement of the rod relative to such bar, said locking bar being movable on said rod from a locking position where the hasp engages in sealing relation with said staple and the rod is in the narrow slot portion of the locking bar to an unlocked position where the hasp is removed from the staple and the rod is in the enlarged end portion of the locking bar slot, the outer end of said bushing having a transverse recess into which the locking bar fits when in its locked position to prevent relative rotation between the bushing and locking bar.

3. A reset device as claimed in claim 2, in which the slotted portion of the locking bar is curved forward away from the wall for the purpose of making it easier to secure locking means through the enlarged slot portion thereof.

4. A reset device of the type adapted to transmit motion from the exterior to the interior of an encased mechanism comprising in combination with a casing wall having an opening therethrough, a bushing extending through said wall opening and secured in immovable fixed relation to said wall, a circular rod extending through said bushing with a sliding and rotational fit, said rod having an inner end enlargement to limit outward movement of said rod and a head on its outer end to limit inward movement of said rod and a length sufficient to permit desired operational axial movement of said rod through said bushing, a radially extending sealing staple on said head, a locking bar having a hasp portion and a slotted locking portion bent at right angles to each other with said rod extending through the slotted portion of such locking bar adjacent the outer end of said bushing and the hasp portion of such locking bar extending towards said staple, the outer end portion of the slot in said locking bar being enlarged to freely embrace the rod and the remaining portion of such slot having a width less than the diameter of said rod, said rod being slotted to permit it to pass through the narrow portion of the locking bar slot at a point along said rod adjacent the outer end of said bushing when the rod is in its outward limiting position, said locking bar securing said rod against any appreciable axial or rotational movement relative to the bar when the rod is in the narrow slot portion of the bar, said bar being slidable transversely of said rod between a locking position where the rod is in the narrow slot portion of such bar and the hasp portion of the bar is in sealing engagement with said staple and an unlocked position where the rod is embraced by the enlarged end portion of the locking bar slot and the hasp portion of the locking bar is removed from said staple, the outer end surface of said bushing having means engaging said locking bar to prevent relative rotation between the two when the bar is in locking position, and a compression spring on said rod between the locking bar and head biasing said rod to its limiting outward position but permitting it to be pushed inward and turned when unlocked.

GEORGE B. MANNING.

REFERENCES CITED

The following references are of record in the file of this patent:

UNITED STATES PATENTS

| Number | Name | Date |
|---|---|---|
| 1,208,236 | Thompson | Dec. 12, 1916 |
| 1,573,380 | Evans | Feb. 16, 1926 |
| 1,627,752 | Small | May 10, 1927 |
| 2,123,943 | Hamill | July 19, 1938 |
| 2,006,321 | Stark et al. | June 25, 1935 |
| 2,127,505 | Emens | Aug. 23, 1938 |
| 2,523,392 | Rabinowitz et al. | Sept. 26, 1950 |
| 2,531,948 | Road | Nov. 28, 1950 |
| 2,546,148 | Bowzer | Mar. 27, 1951 |
| 2,333,584 | Rosberg | Nov. 2, 1943 |

FOREIGN PATENTS

| Number | Country | Date |
|---|---|---|
| 623,151 | Germany | Dec. 14, 1935 |